United States Patent [19]
Burke

[11] Patent Number: 5,820,453
[45] Date of Patent: Oct. 13, 1998

[54] METHOD AND APPARATUS FOR CLEANING ANIMAL INTESTINES

[75] Inventor: Thomas J. Burke, Oldwick, N.J.

[73] Assignee: M & P Chitlin Co., Inc., Edison, N.J.

[21] Appl. No.: 740,504

[22] Filed: Oct. 30, 1996

[51] Int. Cl.$^6$ ..................................................... A22C 17/16
[52] U.S. Cl. .......................................... 452/123; 452/173
[58] Field of Search ....................................... 452/123, 173

[56] References Cited

U.S. PATENT DOCUMENTS

| | | |
|---|---|---|
| 179,755 | 7/1876 | Adamson . |
| 482,600 | 9/1892 | Trips . |
| 1,210,959 | 1/1917 | Luer . |
| 1,294,455 | 2/1919 | Hardy . |
| 1,492,697 | 5/1924 | Neuberth . |
| 1,781,301 | 11/1930 | Randall . |
| 1,876,676 | 9/1932 | Hill . |
| 2,119,311 | 5/1938 | Biedermann . |
| 2,526,449 | 10/1950 | Arlow et al . . |
| 2,697,245 | 12/1954 | Clemens et al. ......................... 452/123 |
| 2,701,386 | 2/1955 | Strickler . |
| 2,726,421 | 12/1955 | Strickler . |
| 2,831,209 | 4/1958 | Bergman et al . ....................... 452/123 |
| 3,116,513 | 1/1964 | Ine . |
| 3,137,031 | 6/1964 | Ine . |
| 3,509,593 | 5/1970 | De Moss et al. . |
| 3,611,477 | 10/1971 | Walter et al. . |
| 3,846,869 | 11/1974 | Barbee . |
| 3,882,571 | 5/1975 | Evers et al . ........................... 452/123 |
| 3,958,304 | 5/1976 | Barbee . |
| 4,876,767 | 10/1989 | Harben, III et al. . |
| 4,899,421 | 2/1990 | Van Der Eerden . |

FOREIGN PATENT DOCUMENTS 247751  6/1912  Germany ............................... 452/123

*Primary Examiner*—Willis Little
*Attorney, Agent, or Firm*—Frommer Lawrence & Haug, LLP

[57] ABSTRACT

An apparatus and method for cleaning fecal matter from the interior of an extracted animal intestine. The apparatus has a water supply conduit, a water tube connected to the water supply conduit and at least one outlet for discharging water into an intestine surrounding the tube, and a transporter for moving intestines from one end of the tube towards the opposite end. A method for cleaning extracted tubular animal intestines by placing an animal intestine over a water tube, discharging water from the tube into the intestine and passing the tubular intestine along and off the tube without reversing the direction of movement is also disclosed.

15 Claims, 3 Drawing Sheets

METHOD AND APPARATUS FOR CLEANING ANIMAL INTESTINES

FIELD OF THE INVENTION

The present invention relates to an apparatus and method for cleaning the intestines of animals, particularly the extracted intestines of hogs, to produce a food product known as chitterlings.

BACKGROUND OF THE INVENTION

Animal intestine is a tubular element which extends from the stomach to the anus. The intestines of various animals have been used as a food product. The intestines of hogs extend some 16 feet to 18 feet in length, and in their natural state are of sinuous configuration, with connective tissue, fat and glands on the exterior. Food is received from the stomach and passed along the intestines as fecal matter. The term commonly applied to hog intestines which have been prepared as a food product is the word "chitterling," and this word and the word intestines are used interchangeably herein. For use as food, the chitterling must be cleaned. In preparation for cleaning, it is unstrung by cutting connective tissue between different portions of the intestine.

A machine used for cleaning chitterlings is known as the Strickler machine, such as is shown in U.S. Pat. Nos. 2,701,836 and 2,726,421 to Stricker, and in U.S. Pat. No. 3,509,593 to DeMoss. The chitterling is first placed on the end of a linearly extending pipe, which has a nozzle which directs water forwardly into the chitterling, and engages and removes some of the fecal matter, an appreciable amount of the fecal matter remaining in the intestine. The tubular chitterling is passed over the pipe, and a rotary cutting knife revolving on an axis perpendicular to the pipe slices the chitterling longitudinally from below. The longitudinally slit chitterlings have some fecal matter adhering to them, and also have some glands, fat and connective tissues. The chitterlings after being slit are placed on a spreading carrier and are sprayed with water from below and above for the purpose of removing fecal matter.

In commercial operations, the chitterlings are next delivered to an agitating washer for further cleaning. In the agitating washer, some of the remaining fecal matter, glands, connective tissue and fat are removed by agitative washing and centrifugal force, and the chitterlings are then delivered from the centrifugal washing machine.

The chitterlings at this stage, in many operations, are packaged and sold. These chitterlings have a significant amount of fecal matter, as well as some glands and connective tissue. The purchaser must, of necessity, spend a substantial amount of time in inspecting and manually picking out fecal matter, and fat, glands and connective tissue.

In commercial practice, for greater cleanliness of the chitterlings, they may be passed through an inspection and hand cleaning process in which the chitterlings are individually inspected and substantially all fecal matter, together with connective tissue and fat, are removed. While this additional manual processing step is effective in removing a great amount of undesirable material from the chitterlings, it is an expensive, labor-intensive operation; the costs for these chitterlings which are substantially cleaner than those sold after the centrifugal washing is significantly higher.

The above-described processes and apparatus, which are commercially used in the United States, have a number of deficiencies. Among them are that the chitterlings which are sold after passing through the centrifugal washing machine have a substantial amount of fecal matter remaining, which requires the consumer to remove by careful, time-consuming and labor-intensive hand operations. It has now been recognized that in the above described processing apparatus and method, after the chitterling has been subjected to the initial internal water wash, and is then longitudinally slit and washed, there remains on the chitterling a substantial amount of fecal matter and that further washing in the agitating washing machine causes the fecal matter to be dis-associated from the smooth, non-adherent interior surface of the chitterling, and enter into the water in the agitating washer machine. Due to the movement of the chitterling and of the water, the dis-associated fecal material moves to and adheres to the exterior surface of the chitterling which is adherent to the fecal matter. Hence, it has been noted that the initial internal washing does not remove the fecal matter from the chitterling and that the further spray washing and agitating washing result in fecal matter engaging and adhering to the exterior surface of the chitterling. In the commercial operation using the above-described machine, approximately 6 intestines per minutes are partially cleaned, with a water consumption of approximately 40 gallons per minute. In an eight hour shift, approximately 400,000 gallons of water are used to clean about 16,000 chitterlings, which still have substantial fecal matter remaining.

In addition, the processing of chitterlings by using the machine as above-described requires one or more attendants to manually retrieve a chitterling from a supply of them, place an end of the chitterling over the end of the water tube having the nozzle, and to push the chitterling along the tube. This requires repetitive motions, and subjects the worker to the risk of injury due to a repetition of the same motion many times during the working day.

U.S. Pat. No. 1,492,697 to Neuberth discloses an apparatus for flushing a sausage casings, which is placed on the end of a pipe which discharges water into the casing. The casing has been previously cleaned and stored in salt, and the purpose of the machine is to flush out the salt within the casing. Cooperating with the pipe is a feed wheel which causes the casing to move over and along the pipe. The pipe can be removed and placed on the outlet of a filling machine, to fill the casing. After the casing is filled, it is removed from the pipe by passing it over the nozzle end of the pipe.

U.S. Pat. Nos. 3,116,513 and 3,137,031 to Ine disclose an apparatus for removing fecal matter from the cloaca of a chicken while it is still in the chicken. The cloaca has a relatively short length, amounting to a few inches, and is only a part of the intestine of the chicken. The removal of fecal material is accomplished by inserting a combined water and suction nozzle through the anus and into the cloaca, the nozzle and then being withdrawn.

OBJECTS OF THE INVENTION

Among the objects of the present invention are to provide a method and apparatus for cleaning extracted animal intestines which will produce clean product without inspection and hand cleaning.

Another object of the present invention is the provision of such a method and apparatus which will have substantially reduced water consumption, while achieving a substantially higher level of cleanliness of the finished product without hand cleaning.

It is still a further object of the present invention to provide a method and apparatus for cleaning extracted animal intestines in which there is a reduced hazard to the health of the workers.

Another object of the present invention is to provide a method and apparatus for cleaning animal intestines which results in a lower cost of production.

SUMMARY OF THE INVENTION

An apparatus for cleaning chitterlings comprises a longitudinally extending water tube having a proximal end releasably connected to a water supply, and a distal end having a nozzle which discharges water into the interior of an intestine which is threaded over the distal end. Preferably a return tube surrounds the water tube for removing water which has been discharged into the intestine, together with substantially all of the fecal matter from within the intestine.

In a preferred embodiment, the water tube is somewhat flattened, and at its end has a central, forwardly directed opening and two skewed, downwardly directed openings, so as to effect substantially complete dislodgement, breaking up and washing out of fecal matter from within the intestine.

Near its distal end, the return tube, with the water tube within and secured to it, has a pair of driven rollers which feed or transport the chitterlings along the return tube, towards the proximal end of the return tube and the water tube. At the proximal end of the water tube there is a water supply conduit, and the releasable coupling mechanically connects the water supply conduit and the water tube. The return tube is supported near its distal end for pivotal movement, and near its proximal end an elevator, powered by a pneumatic motor, is provided, to rotate the return tube and water tube about the pivotal support to incline them upwardly, after the releasable coupling is disconnected. Above the return tube and water is a transporter, in the form of a belt trained over a pair of rollers, at least one of which is powered. The transporter belt is at an incline, and when the return tube and water tube are caused to be inclined, the lower run of the transporter belt is closely adjacent the water tube, and is effective to transport cleaned chitterlings which have been threaded onto the return tube off of the proximal end of the return tube and over the disconnected proximal end of the water tube.

DETAILED DESCRIPTION OF PREFERRED EMBODIMENT

Figure 1:
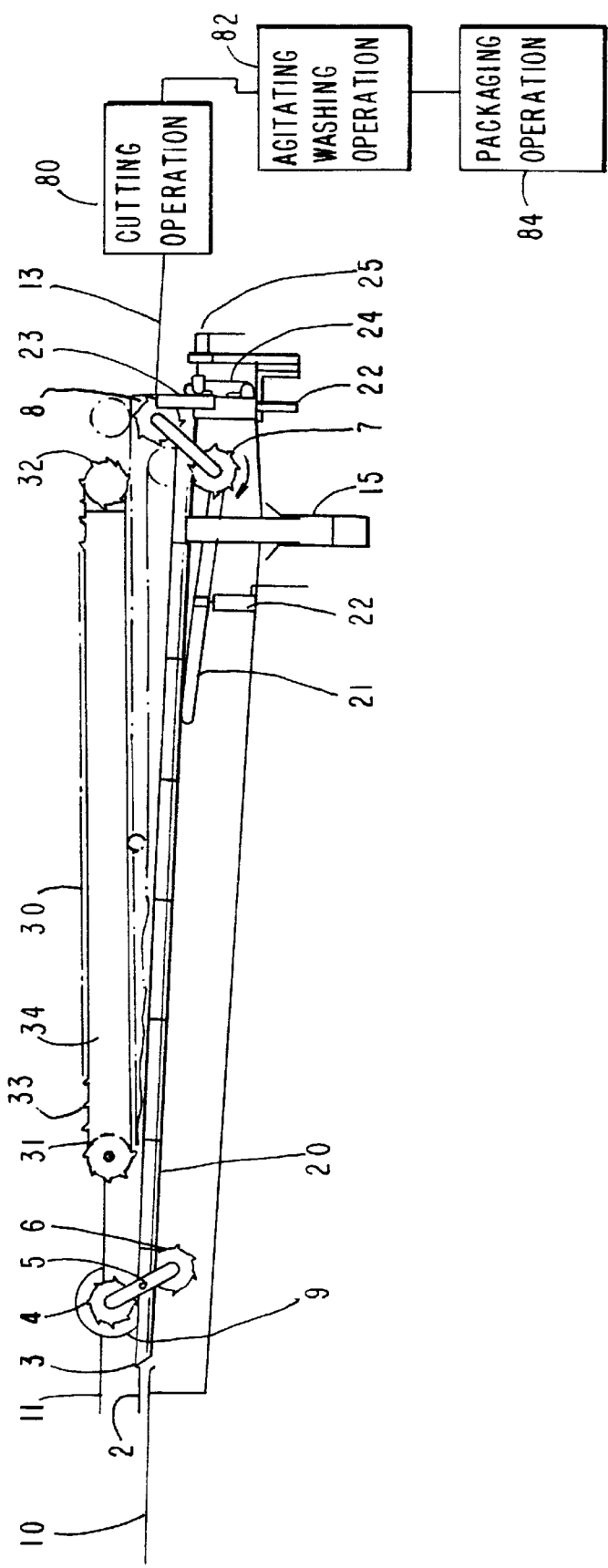
FIG. 1 is an elevational view, partly diagrammatic, of an apparatus is accordance with the present invention.

Referring now to the drawing wherein like or corresponding reference numerals are used for like or corresponding parts through out the several views, there is shown in FIG. 1 a loading table 10 for receiving a supply of extracted hog intestines or chitterlings. Adjacent the end of loading table 10 is a trough 11, with parts broken away to show elements of the apparatus which are partly within the trough 11. Within the trough 11 there is a tube assembly generally designated 20 comprising, as a discussed here and below, an outer return tube having within it a somewhat flattened water tube. A support 40 is provided for the left hand or distal end of the tube assembly 20. A pair of transport rollers 4 and 6 are connected through a link 5, which is pivotally secured to the tube assembly 20. The rollers 4 and 6 are provided with projections and are made of a relatively soft material, so as to feed or transport chitterlings placed over the end of the tube assembly 20, towards the right hand or proximal end thereof. A shield 9 partly surrounds the roller 4. Either the roller 4 or the roller 6 may be driven, with a drive apparatus (not shown) for one on the other, such as a chain, belt or gearing; alternatively, both the rollers 4 and 6 may be powered.

A transporter 30 is provided above the tube assembly 20, extending over part of its length from near the rollers 4 and 6 to adjacent a second pair of rollers 7 and 8 with a link 10 secured to tube assembly 20. The transporter 30 comprises roller 31 and 32, and a belt 33 of relatively soft material, the transporter 30 also comprising a support structure 34 for the rollers 31 and 32; either of the rollers 31 and 32 may be powered. The transporter 30 is inclined, since the roller 32 is at a higher elevation than the roller 31.

The tube assembly 20 shown in FIG. 1 is in an inoperative position with regard to the transporter 30, since the belt 33 cannot engage and transport intestines on the tube assembly 20 when the tube assembly is horizontal and at an angle to the transporter 30.

An elevator is provided to incline the tube assembly 20 by rotating it about the support 40, and which comprises a bar 21 having one end beneath the tube assembly 20 and the other end supporting the proximal end roller assembly including the rollers 7 and 8. Connected to the bar 21, for raising it, is a pneumatic motor 22 which is provided with gas under pressure, and suitable control valves for extending the retracting the piston thereof which is connected to the bar 21.

When the pneumatic motor 22 is actuated, it causes the tube assembly 20 to pivot about the support 40, and brings it into position where it is closely parallel to, but slightly spaced from, the lower run of the belt 33, thus enabling the transporter 30 to become operative in relation to the tube assembly 20 so as to cause chitterlings on the tube assembly 20 to be transported along and off of the proximal end of the tube assembly 20.

Also shown in FIG. 1 are a water supply conduit 22, which connects with a part of a releasable coupling, described herein below. A guide 23 is provided for the proximal end of the tube assembly 20, and a latch 24 is provided for the coupling, actuated by a motor 25. Near the proximal end of the tube assembly 20, the return tube 50 has a discharge opening therein (not shown), which is registry with a collection tube assembly 15.

A receiving table 13 is adjacent the proximal end of tube assembly 20 for receiving cleaned intestines which have been discharged from it.

Figure 2:
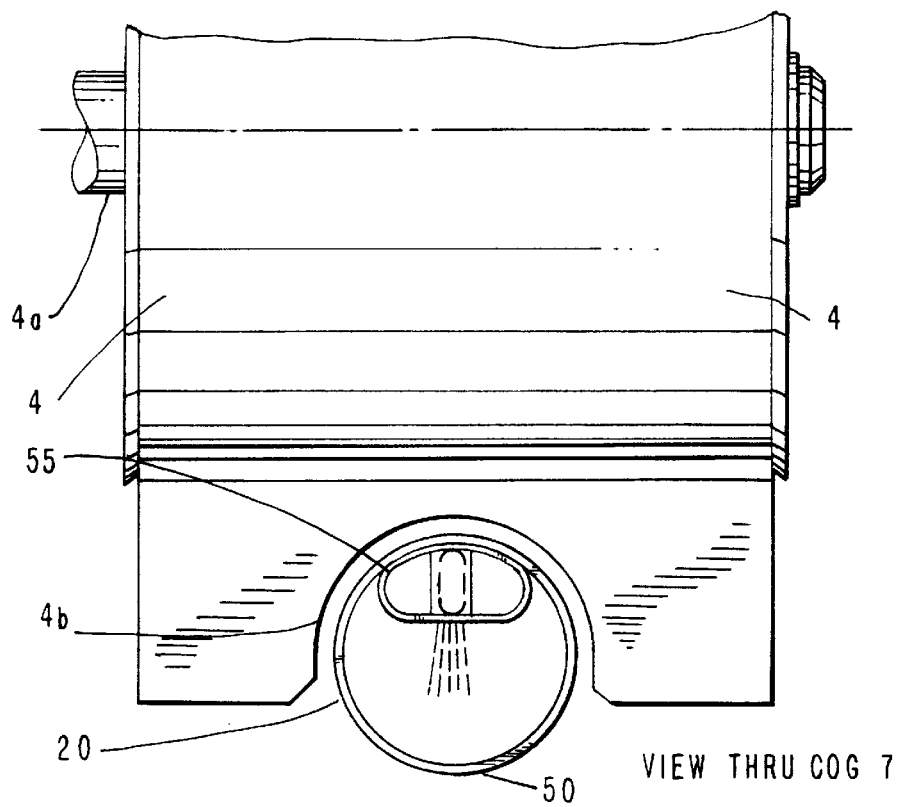
FIG. 2 is a view taken on the line 2—2 of FIG. 1.

Referring now to FIG. 2, there may be seen the roller 4 which is carried by a shaft 4a, the roller 4 having a groove 4b therein in which there is the tube assembly 20.

Figures 3, 4:
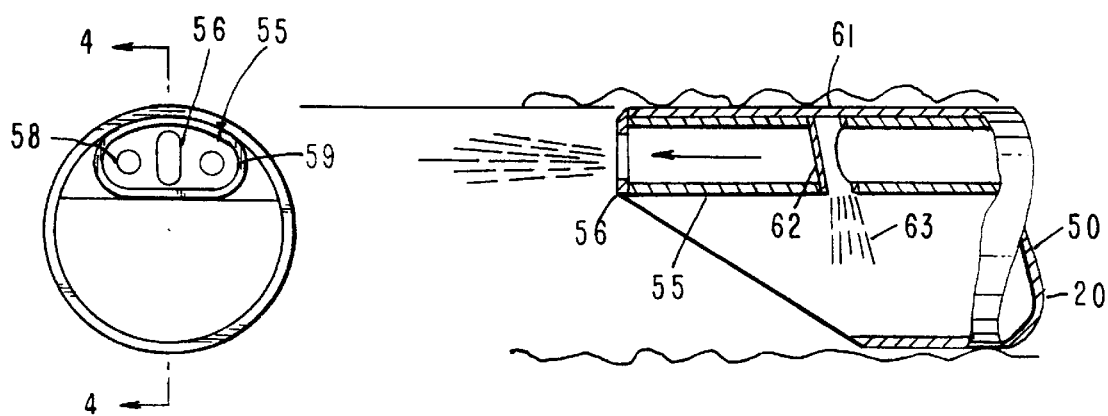
FIG. 3 is a view taken on the line 3—3 of FIG. 1.
FIG. 4 is a cross sectional view taken on the line 4—4 of FIG. 3.

Tube assembly 20, as shown in FIGS. 2, 3 and 4, includes an outer cylindrical return tube 50 having within it, and secured to it, a water tube 55 of somewhat flattened non-circular configuration. As shown in FIG. 3, the water tube 55 is in the upper part of the return tube 50, and has at its distal end a plate 56 in which there is a central opening 57 which are in skewed relationship to the central opening 57, the side opening 58 directing water somewhat downwardly to the left and the side opening 59 directing water downwardly to the right, as shown in FIG. 3.

Referring to FIG. 4, somewhat spaced from the plate 56 is an opening in the lower part of the water tube 55, adjacent to which, and closer to the distal end of water tube 55 is a diverter plate 62 which extends laterally substantially coextensively with the opening 61, as shown in FIG. 2. This diverter plate 62 diverts some of the water flowing through the water tube 55 downwardly, and rearwardly, so that the water flowing through the opening 61 will serve to push water and fecal matter from an intestine threaded over the tube assembly towards the proximal end of the return tube 50, where it is discharged into the collection tube assembly 15. As will be understood, other means may be employed to cause water to flow to the collection tube assembly 15, such as a venture pump, pneumatic suction pump, etc.

Figure 5:
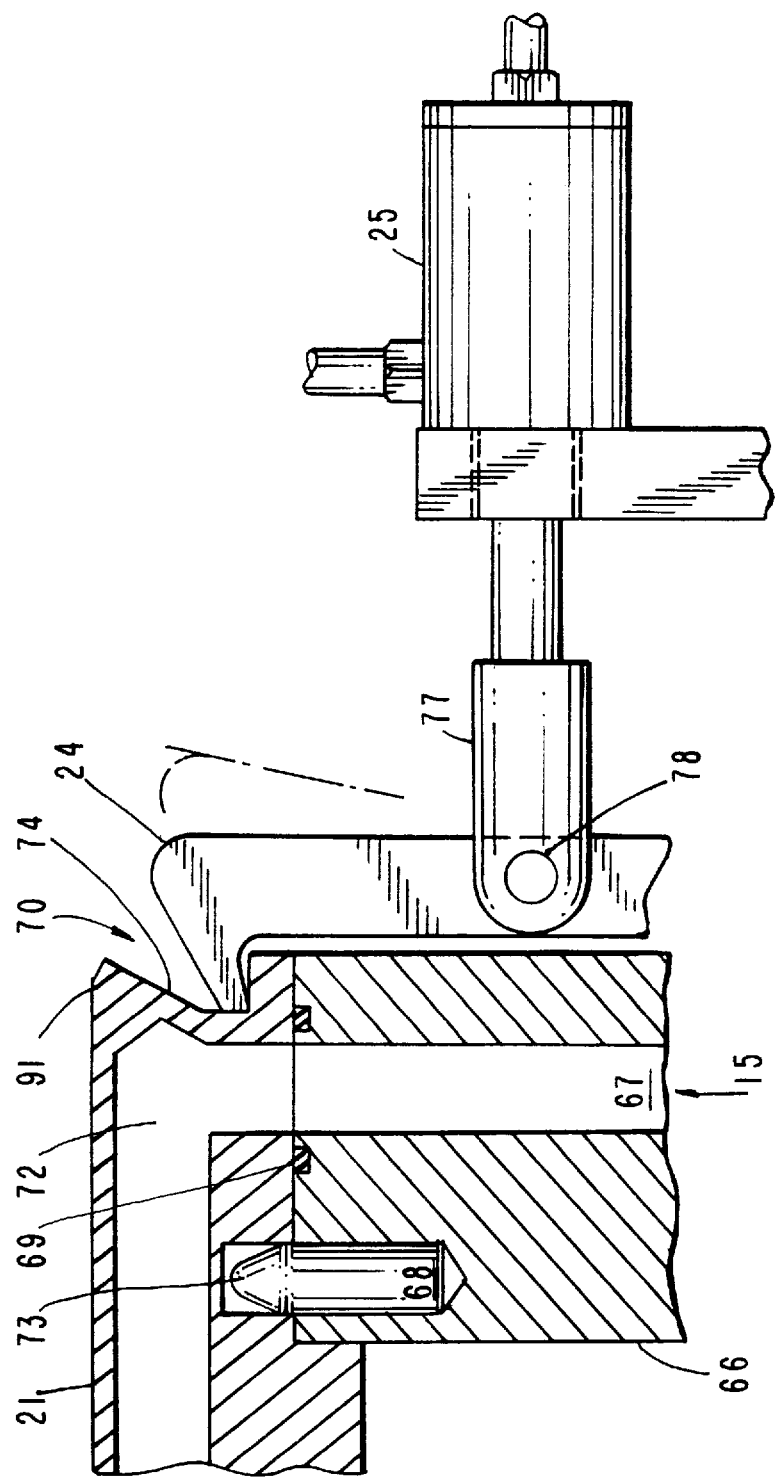
FIG. 5 is a cross sectional view illustrating a releasable coupling forming a part of the apparatus of FIG. 1.

Referring now to FIG. 5, there is shown a releasable coupling 70, comprising a part 66 which has a passage 67 therein to which the water supply conduit 22 is connected. A centering pin 68 is provided in and extends from the upper surface of the coupling part 66. Also provided in part 66 is on O-RING 69 or other sealing element in surrounding relationship to the passage 67. Coupling part 71 of coupling of 70 has a transverse passage 72 having one end in communication with the water tube 55, to which it is connected. The coupling part 71 has a recess 73 to receive the conical end of centering pin 68, and the coupling part 71 also has a notch 74 which receives a tooth 76 of latch 24. Latch 24 is operated by the pneumatic motor 25 through a link 77 which is pivotally connected to it by a pin 78.

After intestines have been internally cleaned in the apparatus shown in FIG. 1, they may be cut into a short tubular sections of approximately 15–18 inches in length as at 80 in FIG. 1. These tubular intestine sections are then introduced into a commercially available agitating washing and centrifuging machine as at 82 in FIG. 1, where the tubular intestine sections are agitated to further wash and disassociate any small amount of remaining fecal matter, after which there is a centrifuge action which removes water and any fecal matter. The cleaned tubular intestine sections are then removed from the washing and centrifuging machine and are packaged as at 84 in FIG. 1.

In operation, an intestine is removed from the loading table 19 and is placed over the distal end of the tube assembly 20, where water discharged from the distal end of water tube 55 strikes fecal matter and dislodges and breaks it up. The fecal matter is carried by the water current, assisted by the flow of water from the diverter 62, to the collection tube assembly 15. As soon as the intestine is placed over the tube assembly 20, and is pushed a short distance there along, it is engaged by the rollers 4 and 6 which force it further along the tube assembly 20 towards the proximal end thereof, and a number of intestines, such as six, are then stacked or shirred on the tube assembly 20. The pneumatic motor 25 is then actuated to withdraw the latch 24, so as to free the coupling part 71 for movement of the tube assembly 20, and the pneumatic motor 25 is then actuated, to raise the tube assembly 20 about the support 40, bringing it into close substantially parallel relationship with the lower run of the belt 33 of the transporter 30. The belt 33 is driven, and transports the intestines which have been accumulated on the tube assembly 20 off of the proximal end of tube assembly 50, assisted by the rollers 7 and 8.

Upon completion of removal of the intestines in this matter, the tube assembly 20 is lowered and coupling is then in operative position. More intestines may then be placed over the distal end of the tube assembly, for a new batch.

With the present apparatus, there is reduced utilization of water. It is estimated that the water consumption for an eight hour shift producing some 16,000 clean chitterlings is approximately 32,000 gallons, substantially less than is consumed using the apparatus and method of the prior art. The chitterlings cleaned by the apparatus herein disclosed are substantially free of fecal matter, without resort to hand removal of fecal matter particles, and are substantially cleaner than the chitterlings produced by the known apparatus and method. In addition, with the apparatus and method of the present invention, there is less risk of injury to personnel because of repetitive motion injury and the production costs are significantly decreased.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. An apparatus for cleaning fecal matter from the interior of an extracted animal intestine comprising:
   a. a water supply conduit;
   b. a water tube having a proximal end releasably connected to said water supply conduit and a free distal end having at least one outlet for discharging water into an intestine surrounding said tube wherein said at least one outlet is at the distal end of said tube,
   c. a transporter for moving intestines from adjacent the distal end of said tube towards the proximal end; and
   d. a return tube, said water tube being eccentrically positioned within said return tube, and said return tube having a discharge opening remote from the outlet of said water tube for discharging water and fecal matter.

2. The apparatus of claim 1, wherein said tube has plural outlets at the distal end thereof.

3. The apparatus of claim 2, at least the portion of said tube adjacent the distal end having an axis, at least one said outlet directing water in the axial direction, and at least one outlet directing water in a direction skewed relative to the axial direction.

4. The apparatus of claim 2, wherein said tube is of non-circular flattened configuration and comprises a central outlet for directing water in the axial direction and at least two side outlets for directing water in directions oppositely skewed relative to the axial direction.

5. The apparatus of claim 1, further comprising a means for effecting the movement of water and fecal matter in said return tube towards said discharge opening.

6. The apparatus of claim 1, further comprising a diverter adjacent to the terminal end of said water tube for causing water and fecal matter to flow in said return tube towards said discharge opening.

7. The apparatus of claim 6, said diverter comprising an element extending transversely of said water tube, and an opening in said water tube adjacent to said element, said element being closer to said distal end of said water tube than said water tube opening.

8. The apparatus of claim 1, said transporter and said water tube having an inoperative position in which said transporter is not operative to move intestines towards the proximal end of said water tube and an operative position in which said transporter moves intestines toward said proximal end, and a means for moving at least one of said transporter and water tube to and from said inoperative position and said operative position.

9. The apparatus of claim 8, wherein said transporter is linearly extending and in said inoperative position is angularly related to said water tube, and said moving means comprises a means for moving one of said water tube and said transporter from said inoperative angularly related position to a substantially parallel operative position in which said transporter moves intestines towards said proximal end of said water tube.

10. The apparatus of claim 1, said transporter being linearly extending, said apparatus further comprising a means for supporting said water tube at a location adjacent said distal end thereof, and a means for moving said water tube about said location from an inoperative position in which said transporter and said water tube are angularly related to an active position in which said transporter and water tube are substantially parallel.

11. The apparatus of claim 10, wherein a releasable coupling releasably connects said water tube and a water supply conduit, and actuating means for releasing said releasable coupling.

12. The apparatus of claim 1, wherein a releasable coupling releasably connects said water tube and a water supply conduit, and actuating means for releasing said releasable coupling.

13. A method for cleaning extracted tubular animal intestines comprising the steps of: placing an animal intestine having fecal matter therein over a water tube, discharging water from said water tube to remove the fecal matter from the intestine and to break up the fecal matter, removing the water and fecal matter, and passing the tubular intestine along and off the tube without reversing the direction of movement thereof.

14. The method of claim 13, further comprising the steps of retrieving tubular intestines passed off the tube and agitatively washing said intestines.

15. The method of claim 14, further comprising the step of cutting said retrieved tubular intestine into short lengths before the agitative washing thereof.

* * * * *